US 6,545,579 B1

(12) United States Patent
Dimke et al.

(10) Patent No.: US 6,545,579 B1
(45) Date of Patent: Apr. 8, 2003

(54) DEVICE FOR RETAINING COMPONENTS MADE FROM A FERROMAGNETIC MATERIAL

(75) Inventors: Reinhard Dimke, Stuttgart (DE); Josef Weber, Oberriexingen (DE); Juergen Hackenberg, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/508,397

(22) PCT Filed: Jun. 22, 1999

(86) PCT No.: PCT/DE99/01819

§ 371 (c)(1),
(2), (4) Date: Jun. 19, 2000

(87) PCT Pub. No.: WO00/02702

PCT Pub. Date: Jan. 20, 2000

(30) Foreign Application Priority Data

Jul. 10, 1998 (DE) .......................... 198 31 064

(51) Int. Cl.$^7$ .............................. H01F 7/20; H01F 7/04
(52) U.S. Cl. ........................................ 335/285; 335/286
(58) Field of Search ................... 335/285–296, 335/302–306; 269/8

(56) References Cited

U.S. PATENT DOCUMENTS

| 3,786,386 A | * | 1/1974 | Cardone et al. ............. 335/295 |
| 4,075,589 A | * | 2/1978 | Braillon ....................... 335/286 |
| 5,428,331 A |   | 6/1995 | Juergen et al. ............... 335/285 |

* cited by examiner

Primary Examiner—Ramon M. Barrera
(74) Attorney, Agent, or Firm—Kenyon & Kenyon

(57) ABSTRACT

A device for holding components made of a ferromagnetic material that are arranged consecutively in a row and are held in place with one contact surface resting against at least two adjacent magnetic poles of opposite polarity, with the magnetic lines of force between the magnetic poles being concentrated in a region close to the contact surface of the components without magnetically influencing the working surfaces opposite the contact surfaces, in which the component holding capacity of the device is considerably increased, without impairing the residual magnetic field in the edge areas, by arranging multiple rows of the components parallel to each other and assigning to the outer rows of the components additional magnetic circuits that divert or compensate for the residual magnetic field of the working surfaces of the components.

11 Claims, 3 Drawing Sheets

DEVICE FOR RETAINING COMPONENTS MADE FROM A FERROMAGNETIC MATERIAL

FIELD OF THE INVENTION

The present invention relates to a device for holding components that are made of a ferromagnetic material, are arranged consecutively in a row and are held in place with one contact surface resting against at least two adjacent magnetic poles of opposite polarity, with the magnetic lines of force between the magnetic poles being concentrated in a region close to the contact surface of the components without magnetically influencing the working surfaces opposite the contact surfaces.

BACKGROUND INFORMATION

A device of this type is used for holding components, which, for example, are only partially coated in an electroplating bath on their ends facing away from the contact surfaces. In this case, the device is limited to only one row of consecutive components, and the magnetic poles of alternating polarity each extend across the entire row.

Magnet strips and pole strips can be used for this purpose. With a device of this type, the components do not have to have a sufficient residual magnetic field on their working surfaces to hold ferromagnetic particles in place. The attracted and held particles would cause beads to form during coating, which would prevent the component from being used in the coated region, due to the latter's poor surface quality.

Devices of this type are often used to machine very small components in large quantities. Arranging the components in only one row results in an unwieldy device when a large number of components need to be machined at the same time.

SUMMARY OF THE INVENTION

An object according to an exemplary embodiment of the present invention is to provide a device that preamble which can be used to greatly increase the number of components to be held and worked simultaneously without having to deal with disadvantageous residual magnetic fields on the component working surfaces.

This objects may be achieved according to an exemplary embodiment of the present invention by arranging multiple rows of components parallel to one another and assigning to the outer rows of components additional magnetic circuits that divert or compensate for the residual magnetic field of the working surfaces of these components.

According to an exemplary embodiment, a large number of components can be arranged and held magnetically in place in parallel rows without producing, particularly in the outer rows, disadvantageous magnetic fields that would make it impossible to work components in these outer rows. The entire grid can be fitted with component holders. Despite the considerably greater number of components to be held, the device can be produced with a compact design. The additional magnetic circuits on the outer rows, which take up little space and do not add much to the cost, can help avoid disadvantageous residual magnetic fields on the component working surfaces. The only thing to keep in mind is that the additional magnetic circuits must have the same polarity as the adjacent magnetic poles in the outer rows of components.

According to an exemplary embodiment, the layout of the magnetic circuits is designed so that at least one magnet strip, held in place between two pole strips and magnetizing the latter with the opposite polarity, extends across each row of components; and the pole strips, together with the magnet strips held between them, form the magnetic poles of alternating polarity for the assigned row of components, with the adjacent magnetic poles of the pole strips in adjacent rows also having the same polarity. Standard magnet strips and standard pole strips can be used in this manner to construct the device.

According to an exemplary embodiment, the adjacent pole strips in adjacent rows can be spaced a certain distance apart. However, the adjacent pole strips can also lie directly against one another and can be combined in each case to form a common pole strip.

To hold magnet strips and pole strips in position, the magnet strips and pole strips are held by a contact plate in a cartridge that faces the contact surface of the components, with this contact plate being provided with grooves in the region of the magnet strips; and the grooves extend across the assigned row of components and are provided in the side of the contact plate facing the contact surfaces of the components. The grooves in the contact plate guide the main field between adjacent magnetic poles of opposite polarity over the held component and not over the electrically and magnetically conductive contact plates If the additional magnetic circuits are formed by additional magnet strips that rest against the outer pole strips of the outer rows of components and magnetize the latter with the same polarity as the magnet strips assigned to the outer rows of components, the same magnet strips can be used for the additional magnetic circuits, and they need only to be added on, taking the polarity into account.

To maintain the same magnetic values in the regions of the additional magnetic circuits, the contact plate extends beyond the additional magnet strips and is provided with correspondingly assigned grooves; and the distance between the additional magnet strips and the magnet strips of the outer rows of components is approximately half the distance between the magnet strips of adjacent rows of components.

To magnetically terminate the additional magnetic circuits, according to an exemplary embodiment, the additional magnet strips can be terminated by an additional pole strip on the side facing away from the rows of components.

If the contact plate extends beyond the additional magnetic circuits with their magnet strips and, together with at least one magnet strip and two pole strips, forms in each case a magnetic holding circuit for spacing elements which carry a holding plate provided with guide and cover holders for the components, the device can be equipped with additional means, also held magnetically in place, for guiding and covering the components.

Because the contact plate is also used as an electrical connection for the electroplating bath, the contact plate according to an exemplary embodiment is made of a ferromagnetic material with a gold-plated and rhodanized surface that is resistant to the treatment medium for the components.

DETAILED DESCRIPTION

Figure 1:
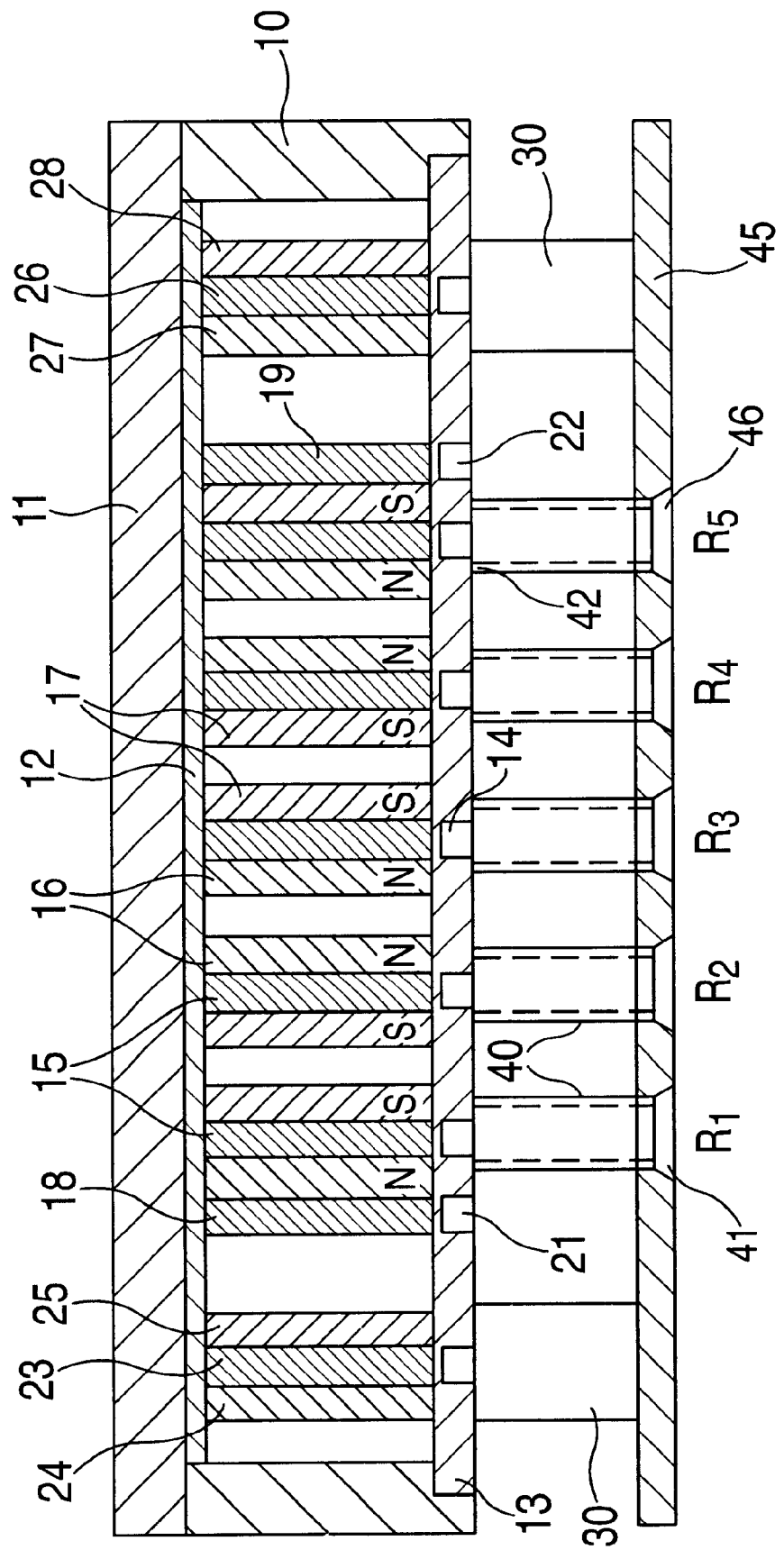
FIG. 1 shows a first exemplary cartridge composed of a frame and a cover, both of which are made of a non-magnetic material, for holding components made of a ferromagnetic material.

The Figures show a cartridge including of a frame 10 and a cover 11, both of which are made of a non-magnetic material. This cartridge can hold five parallel rows of magnetic circuits for five rows of components 40. Each magnetic circuit has one magnet strip 15, in the form of permanent magnets, that is arranged between two pole strips 16 and 17. Magnet strips 15 and facing pole strips 16 and 17 extend over the entire assigned row $R_1$, $R_2$, $R_3$, $R_4$ and $R_5$, respectively, of components 40 and are polarized so that magnet strips 15 magnetize adjacent pole strips 16 and 17 with different polarities N and S, respectively, as shown by the variable pole strips 16 and 17 identified by N and S, respectively. Note that both adjacent pole strips 16 and 17, respectively, of adjacent magnetic circuits, i.e., magnet strips 15, have identical polarity S or N, and the polarities of the pairs of pole strips 16 and 17, respectively, alternate.

In an exemplary embodiment, components 40 are designed as sleeves whose diameter is adjusted to the assigned magnetic circuit so that both assigned pole strips 16 and 17 at least partially cover component 40 with their magnetic poles of different polarities. Cuboidal magnet strips 15 and pole strips 16 and 17, which may have the same dimensions, are held by an electrically and magnetically conductive contact plate 13 in the cartridge formed by frame 10 and cover 11. On the side facing components 40 in the region of magnet strip 15, this contact plate 13 is provided in each case with a groove 14 which extends across row $R_1$, $R_2$, $R_3$, $R_4$ and $R_5$, respectively, and is approximately the same width as magnet strip 15. Despite the magnetic conductivity of contact plate 13, this generates magnetic poles with alternating magnetism in contact plate 13, producing in each case magnetic fluxes over components 40 in rows $R_1$ through $R_5$ which hold contact surface 42 of component 40 in place against contact plate 13. The base of the groove in contact plate 13 forms a highly resistive magnetic path, ensuring that only a small partial magnetic flux is lost.

Figure 2:
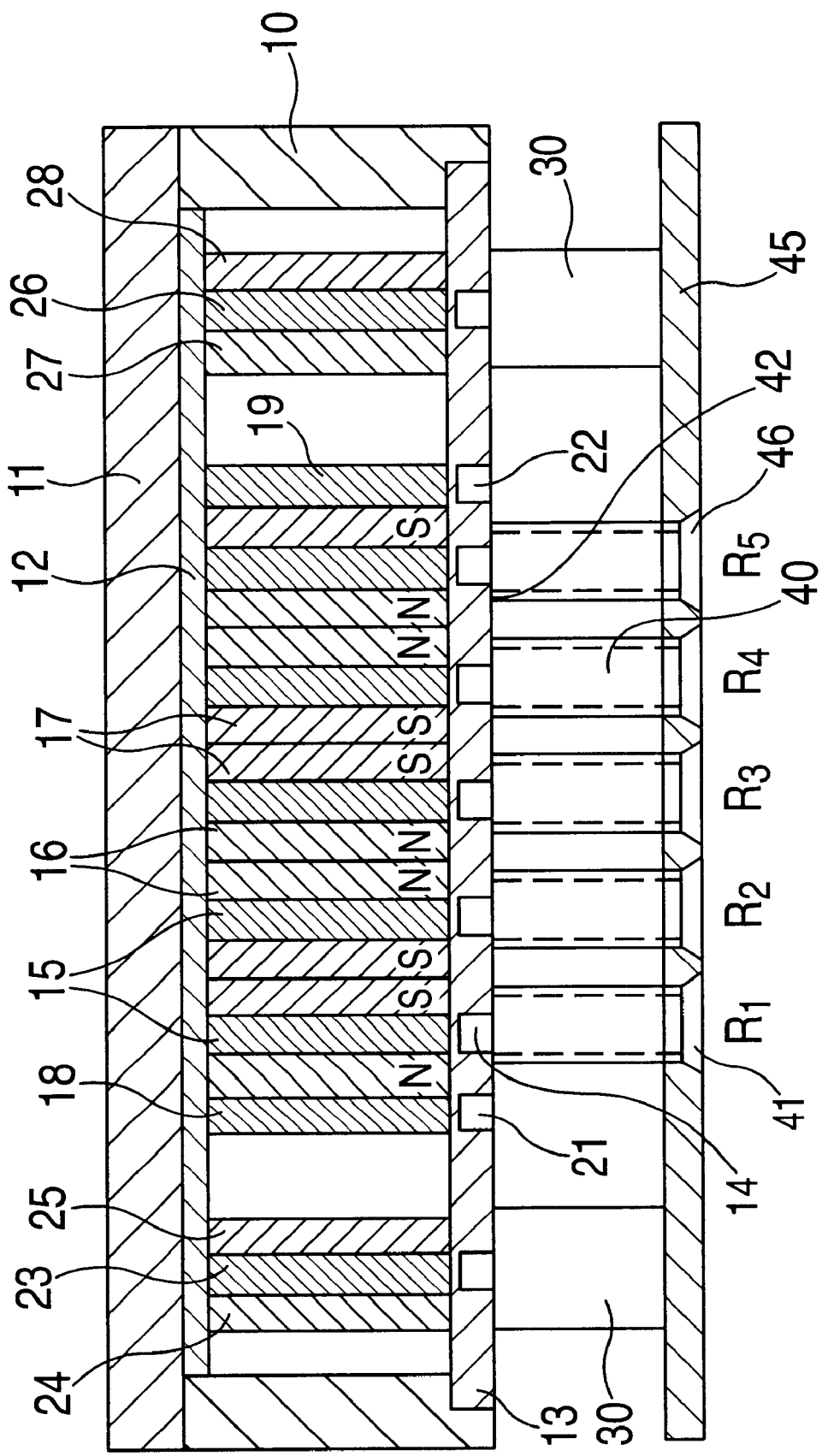
FIG. 2 shows a second exemplary cartridge composed of a frame and a cover, for holding components made of a ferromagnetic material.
Figure 3:
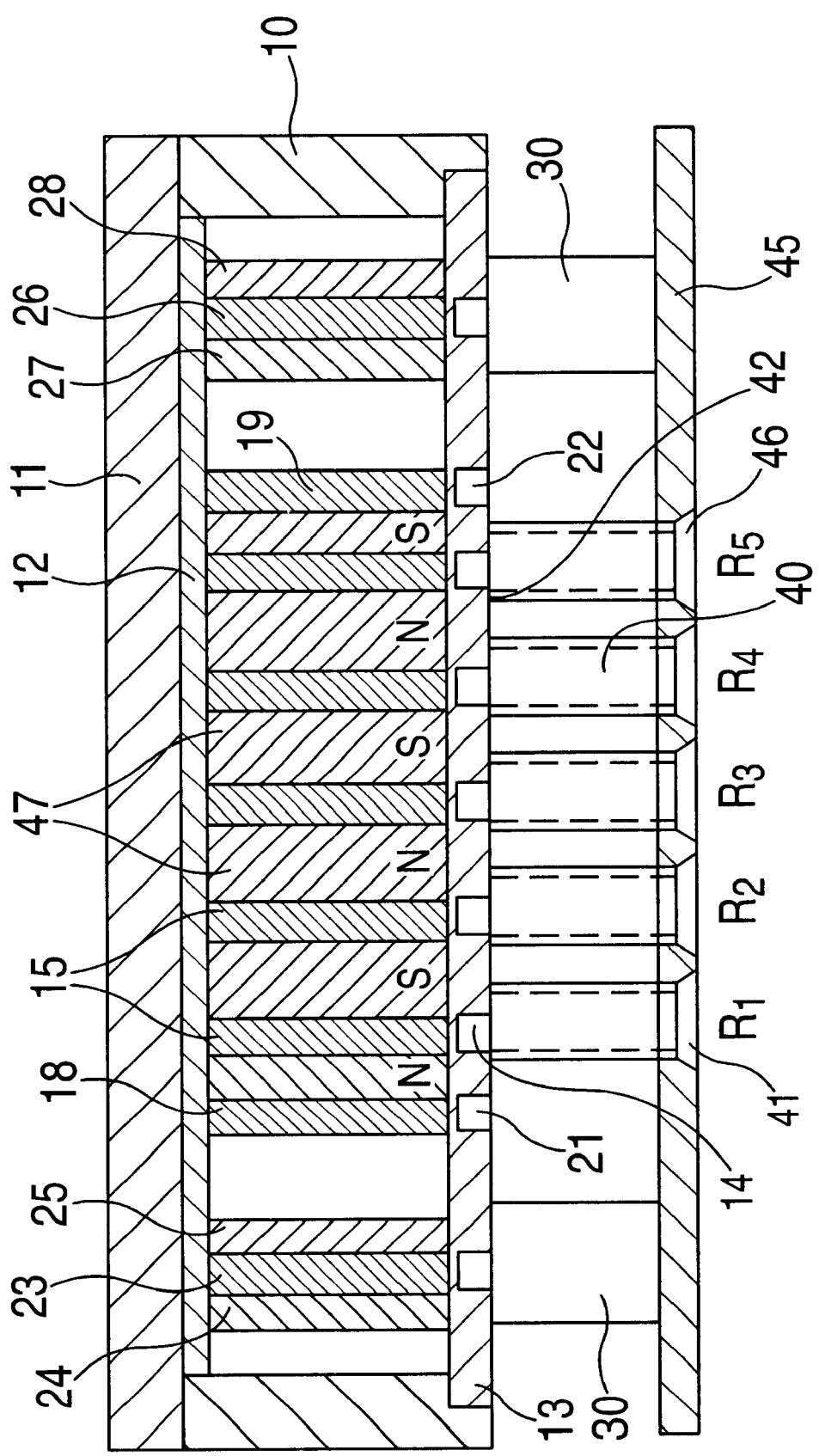
FIG. 3 shows a third exemplary cartridge composed of a frame and a cover, for holding components made of a ferromagnetic material.

The magnetic circuits in rows $R_1$ through $R_5$ can be spaced a distance apart as shown in the drawing. Both pole strips 16 and 17, respectively, between adjacent magnetic circuits (magnet strip 15 between both pole strips 16 and 17) are positioned at a distance corresponding, for example, to the width of one magnet strip 15 or one pole strip 16 or 17. Because adjacent pole strips 16 and 17, respectively, have the same polarity, they can also be arranged in a direct sequence, as can be seen in FIG. 2, or combined into one common pole strip 47, as can be seen in FIG. 3.

Contact strip 13 may be made of a material that is resistant to the medium of an electroplating bath and is provided with a gold-plated and rhodanized surface if the working surfaces 41 of components 40 opposite contact surfaces 42 are coated, for example, with a chromium layer in an electroplating bath.

To ensure that working surfaces 41 of components 40 in outer rows $R_1$ and $R_5$ do not have a residual magnetic field, additional magnetic circuits are required in these outer rows which compensate for the residual magnetic flux in working surfaces 41 of assigned components 40 produced by the ending rows of magnetic circuits. These additional magnetic circuits are formed by additional magnet strips 18 and 19, which lie against outer pole strips 16 and 17 and are arranged so that pole strips 16 and 17 are magnetized just as they are by magnet strips 15 of the outer magnetic circuits, i.e., those of rows $R_1$ and $R_5$. Contact plate 13 also has grooves 21 and 22 in the region of additional magnet strips 18 and 19. The distance between additional magnet strips 18 and 19 (and thus also grooves 21 and 22) and adjacent magnet strips 15 (and thus adjacent grooves 14) is approximately half the distance of magnet strips 15 of adjacent magnetic circuits.

These additional magnetic circuits are sufficient to compensate for the residual magnetic field on working surfaces 41 of components 40 in rows $R_1$ and $R_5$ to the extent that they prevent magnetically conductive particles from being attracted to and adhering to working surfaces 41. If necessary, the outer sides of additional magnet strips 18 and 19 can be terminated with additional pole strips.

As shown in the drawing, contact plate 13 can be extended beyond the additional magnetic circuits and, together with at least one magnet strip 23 and 26, respectively, and two pole strips 24 and 25, and 27 and 28, respectively, forms in these regions in each case a magnetic holding circuit for spacing elements 30 which are then held magnetically against contact plate 13 just like components 40. Spacing elements 30 carry a holding plate 45 with guide and cover holders 46 for the ends of components 40 facing away from contact plate 13. These guide and cover holders 46 make it easier to insert components 40 into the device, leaving only their working surfaces 41 exposed as electrodes for the electroplating bath. Holding plate 45 is non-magnetic and is made, for example, of plastic, as are frame 10 and cover 11 of the cartridge, while contact plate 13 forms the connection for this electrode of the electroplating bath.

Frame 10 and cover 11 can also be made of metal, such as aluminum, and can be connected to contact plate 13 in an electrically conductive manner only. In this case, cover 11 lies above an insulating plate 12 made of a non-ferromagnetic material, such as plastic, and rests against magnet strips 15 and pole strips 16 and 17 as well as additional magnet strips 18 and 19 and magnet strips 23 and 26 and pole strips 24 and 25 as well as 27 and 28 of the holding magnetic circuits.

The magnet strips can, of course, be designed not only as permanent magnets, but also as electromagnets. In addition, multiple magnet strips can also be assigned to a row $R_1$ through $R_5$, with each of these magnet strips being positioned between two pole strips and forming alternating magnetic poles of different polarities for the row of components 40. However, adjacent pole strips in adjacent rows are again provided with the same magnetism.

What is claimed is:

1. A device for holding components that are made of a ferromagnetic material, each component having a contact surface and a working surface, the device comprising:

a frame for receiving a plurality of parallel rows of the components, the frame having a contact plate, the contact plate having a first side and a second side, the frame receiving the components on the second side of the contact plate;

a plurality of parallel magnetic circuits, each circuit consisting of at least one magnetic strip positioned between two pole strips, whereby the at least one magnet strip magnetizes the two pole strips with opposite polarities, the adjacent pole strips of adjacent circuits having opposite polarities, the circuits being attached to the first side of the contact plate; and two additional magnetic circuits, each of the additional magnetic circuits consisting only of at least one magnetic strip, the additional magnetic circuits being attached to the first side of the contact plate and adjacent to the outer magnetic circuits of the plurality of magnetic circuits, whereby the additional magnetic circuits at least one of divert and compensate for residual magnetic fields on the working surfaces of the components.

2. The device of claim 1, in which each of the plurality of magnetic circuits comprises:

two pole strips; and at least one magnet strip being held in place between the two pole strips, whereby the at least one magnet strip magnetizes the two pole strips with opposite polarities, the polarities extending across each of the plurality of rows of the components.

3. The device of claim 2, wherein the plurality of magnetic circuits are arranged such that the pole strips of adjacent magnetic circuits that are magnetized with the same polarity are adjacent to each other.

4. The device of claim 2 wherein the plurality of magnetic circuits are arranged such that the pole strips of adjacent magnetic circuits are spaced a distance apart.

5. The device of claim 2, wherein the plurality of magnetic circuits are arranged such that the pole strips of adjacent magnetic circuits lie directly against one another.

6. The device of claim 2, wherein the plurality of magnetic circuits are arranged such that the pole strips of adjacent magnetic circuits are combined to form a common pole strip.

7. A device for holding components that are made of a ferromagnetic material, each component having a contact surface and a working surface, the device comprising:

a frame for receiving a plurality of parallel rows of the components, the frame having a contact plate, the contact plate having a first side and a second side, the frame receiving the components on the second side of the contact plate, the contact plate including a plurality of grooves;

a plurality of parallel magnetic circuits, each circuit consisting of at least one magnetic strip positioned between two pole strips, whereby the at least one magnet strip magnetizes the two pole strips with opposite polarities, the adjacent pole strips of adjacent circuits having opposite polarities, the circuits being attached to the first side of the contact plate, each of the plurality of magnetic circuits including two pole strips and at least one magnet strip being held in place between the two pole strips, whereby the at least one magnet strip magnetizes the two pole strips with opposite polarities, the polarities extending across each of the plurality of rows of the components, each of the grooves being etched on the second side of the contact plate in a region of the at least one magnetic strip of each of the plurality of magnetic circuits, the grooves extending across a corresponding one of the plurality of rows of the components, whereby the magnetic field of each of the plurality of magnetic circuits is guided over each of the plurality of parallel rows of the components; and two additional magnetic circuits, each of the additional magnetic circuits consisting only of at least one magnetic strip, the additional magnetic circuits being attached to the first side of the contact plate and adjacent to the outer magnetic circuits of the plurality of magnetic circuits, whereby the additional magnetic circuits at least one of divert and compensate for residual magnetic fields on the working surfaces of the components.

8. The device of claim 7, wherein the contact plate comprises an electrically and magnetically conductive material.

9. The device of claim 8, wherein each of the two additional magnetic circuits comprises a single magnetic strip.

10. The device of claim 9, wherein the contact plate extends beyond the additional magnetic circuits and further comprises two additional terminating grooves, each of the additional terminating grooves being etched on the second side of the contact plate in a region of the additional magnetic circuits.

11. The device of claim 10, wherein the distance between each of the additional magnetic circuits and the corresponding magnetic strips of the outer magnetic circuits of the plurality of magnetic circuits is about half the distance between each of the at least one magnet strip of adjacent ones of the rows of the components.

* * * * *